Sept. 8, 1953 — J. L. AASLAND — 2,651,163
CORN HARVESTING UNIT WITH AUXILIARY SNAPPING ROLLS
Filed Dec. 30, 1949

INVENTOR
JOHN L. AASLAND
ATT'Y

Patented Sept. 8, 1953

2,651,163

UNITED STATES PATENT OFFICE 2,651,163

CORN HARVESTING UNIT WITH AUXILIARY SNAPPING ROLLS

John L. Aasland, Moline, Ill., assignor to International Harvester Company, a corporation of New Jersey Application December 30, 1949, Serial No. 135,956

2 Claims. (Cl. 56—107)

This invention relates to new and improved auxiliary snapping rolls for corn pickers.

Corn pickers or corn harvesters are designed to pass through a field of standing corn and thereupon pick or snap ears of corn from their stalks during forward travel of the machine. The major means employed in snapping ears of corn are cooperative rolls generally located on an incline extending forwardly and downwardly and capable of gripping the stalk and simultaneously moving it downwardly and rearwardly therebetween until such time as the ear on the stalk reaches the juncture of the rolls whereupon the ear is stripped or snapped from the stalk and thereafter gathered for delivery to a trailing wagon or the like. It is apparent therefore that snapping rolls must be sufficiently aggressive by irregular surface projections and the like to cause the stalk to be pulled downwardly fast enough so that the ears on the stalk will be removed before the stalk reaches the ends of the rolls. It is difficult to obtain maximum aggressiveness in corn snapping rolls without having a relatively large percentage of stalk break-offs. In other words, the stalk is so mistreated or grabbed by the snapping rolls that the stalk breaks prior to the time when the ear of corn is snapped therefrom. The harvested corn is very often not clean as it contains many short lengths of stalk and is thus undesirable.

In an attempt to overcome the disadvantage of having stalks pass through to the receptacle with ears of corn, trash removing rolls have been employed adjacent wagon elevators or the like. Such trash removing rolls must also be very aggressive and there must be means for feeding the stalk into the trash removing rolls. The broken off butt ends of the stalks pass through the corn harvester first and arrive at the trash rolls in a position and direction making the stripping of an ear from the remaining piece of stalk extremely difficult. Thus the very aggressive trash removing rolls are quite apt to and often do grab hold of the entire ear of corn, breaking it up and throwing it back on the field for a total loss in so far as harvesting is concerned.

It is therefore a principal object of this invention to provide auxiliary snapping rolls for corn pickers located above the regular snapping rolls and adapted to pull upwardly on stalks that might be accidentally severed by the regular snapping rolls for the purpose of discharging the stalk as trash and providing clean ears of corn for storage.

An important object of this invention is to provide auxiliary snapping rolls for corn pickers arranged and constructed to eject stalks upwardly out from the machine directly opposite to regular downwardly moving snapping rolls.

Another and further important object of this invention is the provision of means in a corn picker for positively stripping ears from their stalks regardless of whether the stalk is broken.

A still further important object of this invention is to provide auxiliary cooperative snapping rolls located above and over the upper end portion of regular snapping rolls and capable of gripping stalks lost by regular snapping rolls to thus insure the clean stripping of ears of corn.

Other and further important objects of this invention will become apparent from the disclosures in the following specification and accompanying drawing.

Figure 3:
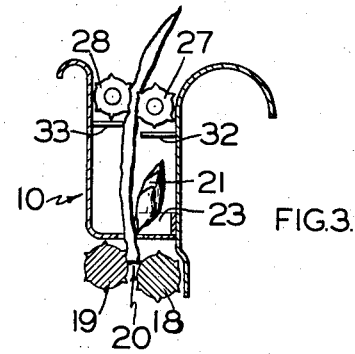
Fig. 3 is a sectional view taken on the line 3—3 of Fig. 1.
Figure 1:
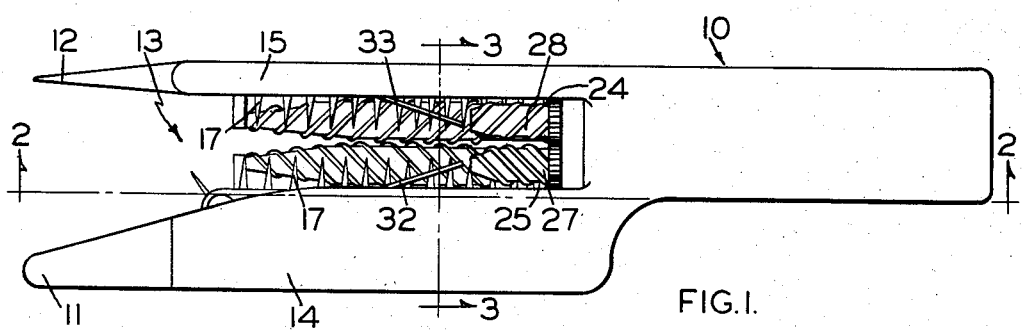
Fig. 1 is a top plan view of the corn gathering and snapping means of this invention.

The reference numeral 10 indicates generally the harvesting or gathering portion of a corn picker having forwardly extending spaced gathering points 11 and 12. The gathering points 11 and 12 taper outwardly and are adapted to direct corn in a row in a field, whether standing or bent over, into a throat portion 13. The throat 13 is further defined by rearwardly extending side units 14 and 15 which are rearward continuations of the points 11 and 12 respectively.

The gathering units 14 and 15 carry gathering chains 16 having fingers 17 projecting into the throat 13 of the corn harvester for picking up and rearwardly feeding stalks of corn into the throat 13 of the machine. Regular corn snapping rolls 18 and 19 rotate inwardly and downwardly in cooperation with each other to pull stalks such as that shown at 20 downwardly therebetween to snap ears of corn 21 from the stalks as the ears approach the juncture between the rolls. After the ear 21 is snapped it is carried by means of a conveyor or gathering chain 22 having inwardly extending fingers 23 extending upwardly over the tops of the rollers 18 and 19 and over the upper portions thereof 24 and 25 which constitute the husking portions thereof. The conveyor chain 22 continues throughout the length of the combined snapping and husking rolls and discharges the snapped and husked ears through the rearward discharge end 26 of the gathering unit. The procedure just described will constitute a major portion of the operation of this corn picker. However, inasmuch as the cooperative snapping rolls 18 and 19 must be made sufficiently aggressive so that the stalk will be positively pulled downwardly therethrough simultaneously with its rearward movement, it is a common occurrence for the stalk to break prior to the snapping of the ears 21. During such a happening the ear would not be snapped but for some other means to accomplish this job. Stalk ejector rolls 27 and 28 are mounted within the supporting structure of the gathering unit 10 and parallel to the inclined combined snapping and husking rolls 18 and 19 but spaced a substantial distance thereabove. In order to further define the vertical spacing between the snapping rolls 18 and 19 and the stalk ejector rolls 27 and 28, attention is directed to Figs. 2 and 3 of the drawing wherein it is shown the distance is slightly in excess of the length of the ordinary ear of corn. The stalk ejector rolls 27 and 28 constitute auxiliary snapping rolls and are arranged and constructed to rotate upwardly and inwardly toward each other so that stalks gripped thereby will be pulled upwardly out of the corn picker. The rolls 27 and 28 are relatively short in length although the length may change with design for various types of corn being picked. In the present machine the auxiliary snapping rolls 27 and 28 are located over the upper end of the snapping portion of the regular snapping rolls 18 and 19 and thus permit the regular rolls to complete their job of snapping in the normal manner. It is apparent therefore that the auxiliary snapping rolls 27 and 28 come into play at a time when the corn stalk 20 is broken by aggressive snapping rolls 18 and 19 and the upper end of this free stalk is grasped by the adjoining ejector rolls 27 and 28. Rolls 27—28 are oppositely threaded.

Figure 2:
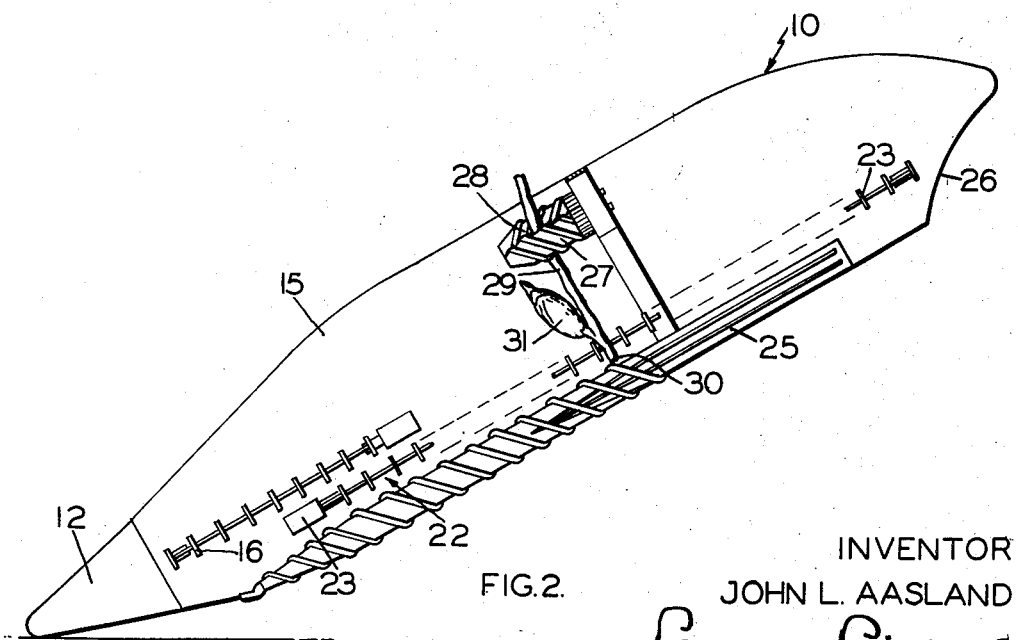
Fig. 2 is a sectional view taken on the line 2—2 of Fig. 1.

As shown in Figure 2, a stalk 29 is broken at its lower end 30 and thus is free from the grip of the regular cooperative snapping rolls 18 and 19. The ejector rolls thereupon grasp the upper end of this stalk 29 and pull the stalk upwardly to accomplish stripping of an ear 31 on this stalk which was missed by the regular snapping rolls because of breakage of the stalk.

As shown in Figure 3, stripper plate 32 and 33 are provided beneath the stalk ejector rolls 27 and 28 respectively and thus act to strip the ear of corn 31 from the broken stalk 29. Stripper plates are employed to prevent contact of the ear and possible destruction of the corn by direct action of the ejector rolls. After the ear 31 is snapped or stripped by the stripper plates 32 and 33, the ear falls down onto the rolls 18 and 19 and is carried by the chain 22 upwardly over the husking portions 24 and 25 of the rolls and is husked in the same manner as ears snapped by the rolls 18 and 19.

Ordinarily, ears of corn grow outwardly and upwardly from the stalk so that stripping of the stalk is more easily accomplished by an upward pulling on the stalk with means to strip the ear from the stalk. This is true because there is a more positive bending and thus snapping of the small upwardly and outwardly inclined stem. In other words, there is a more positive break between the ear and the stalk when the stalk is pulled upwardly than when the stalk is pulled downwardly as in the latter case the ear is pulled inwardly against the stalk. It is thus apparent that the upwardly pulling stalk ejector rolls are conducive to natural ear snapping and stripping and the combination of regular snapping rolls with upwardly spaced auxiliary rolls produces an effective and more complete corn snapper than anything heretofore manufactured.

Numerous details of construction may be varied throughout a wide range without departing from the principles disclosed herein, and I therefore do not propose limiting the patent granted hereon otherwise than as necessitated by the appended claims.

What is claimed is:

1. A gathering unit for corn pickers including spaced gathering points, gathering chains mounted in said gathering units and arranged and constructed to direct stalks of corn rearwardly therebetween, regular snapping rolls journaled in said gathering units and cooperating with each other to pull stalks of corn downwardly therebetween for snapping of ears therefrom, and relatively short auxiliary snapping rolls spaced vertically above said regular snapping rolls a distance slightly in excess of the length of an ordinary ear of corn and lying directly above and vertically over the rear portion thereof, whereby the stalks of corn that are broken by the regular snapping rolls will be pulled upwardly out of the gathering unit by the auxiliary snapping rolls and the ears of corn snapped therefrom.

2. A device as set forth in claim 1 in which the short auxiliary snapping rolls are positioned parallel to said regular snapping rolls and are provided with stripper plates lying parallel to and extending along the rolls and positioned on the under side thereof.

JOHN L. AASLAND.

References Cited in the file of this patent

UNITED STATES PATENTS

| Number | Name | Date |
|--------|------|------|
| 927,660 | Laking | July 13, 1909 |
| 1,023,320 | Kaull | Apr. 16, 1912 |
| 1,042,371 | Baird | Oct. 22, 1912 |
| 2,241,928 | Shedd et al. | May 13, 1941 |
| 2,412,358 | Roe | Dec. 10, 1946 |
| 2,444,561 | Fergason | July 6, 1948 |